(12) United States Patent
Steuer et al.

(10) Patent No.: US 9,103,392 B2
(45) Date of Patent: Aug. 11, 2015

(54) HUB WITH MECHANISM TO PERMIT BACKWARDS MOVEMENT WITHOUT PEDAL MOVEMENT

(75) Inventors: Werner Steuer, Schweinfurt (DE); Gunter Pehse, Niederwerrn (DE); Karl-Joachim Kühne, Oberwerrn (DE)

(73) Assignee: SRAM DEUTSCHLAND GMBH, Schweinfurt (DE)

( * ) Notice: Subject to any disclaimer, the term of this patent is extended or adjusted under 35 U.S.C. 154(b) by 148 days.

(21) Appl. No.: 13/250,372

(22) Filed: Sep. 30, 2011

(65) Prior Publication Data
US 2012/0083383 A1    Apr. 5, 2012

(30) Foreign Application Priority Data
Sep. 30, 2010    (DE) .......................... 10 2010 047 165

(51) Int. Cl.
*F16D 41/26*    (2006.01)
(52) U.S. Cl.
CPC ...................................... *F16D 41/26* (2013.01)
(58) Field of Classification Search
USPC ............. 475/296, 297, 301; 192/43.1, 45.016
See application file for complete search history.

(56) References Cited

U.S. PATENT DOCUMENTS

| 3,114,442 A | 12/1963 | Schwerdhofer |
| 3,608,398 A | 9/1971 | Shimano |
| 5,540,456 A * | 7/1996 | Meier-Burkamp et al. ... 280/236 |
| 6,478,710 B1 * | 11/2002 | Steuer et al. .................. 475/289 |
| 2008/0194376 A1 * | 8/2008 | Kamiya et al. ................ 475/297 |
| 2009/0023542 A1 * | 1/2009 | Hino ............................. 475/318 |
| 2011/0009231 A1 * | 1/2011 | Shoge et al. .................. 475/297 |
| 2011/0048830 A1 * | 3/2011 | Radtke et al. ................ 180/205 |

FOREIGN PATENT DOCUMENTS

GB    951018    3/1964

* cited by examiner

*Primary Examiner* — Justin Holmes
*Assistant Examiner* — Stacy Fluhart
(74) *Attorney, Agent, or Firm* — Milan Milosevic; Lisa Serdynski

(57) ABSTRACT

A control mechanism for decoupling a drive ratchet on a bicycle hub makes it possible to push the bicycle backwards while the foot pedals of the pedal crank drive remain still. These functions can be applied to folding bicycles, in which pedal movements are harmful when in their folded up state. The control mechanism includes a controlling sleeve coupled to the drive ratchet, which is indirectly connected by means of a frictional device to the unmoving hub axle.

11 Claims, 3 Drawing Sheets

US 9,103,392 B2

HUB WITH MECHANISM TO PERMIT BACKWARDS MOVEMENT WITHOUT PEDAL MOVEMENT

BACKGROUND OF THE INVENTION

In drive hubs of muscle-driven vehicles with two wheels with a foot pedal drive and roller chain transmissions, like conventional bicycles for instance, the tensile force is transferred into the tightened strand of the drive chain on a small sprocket wheel on the driver of the back wheel hub. There a torsional moment is created which is transferred over at least one torque path to the sleeve of the back wheel hub.

The hubs can have a gear inside the hub, which can be switched mechanically from outside with a switching device and a switch, or with the help of electrical components, or automatically depending on the hub rotational speed or on the torsional moment in the torque path through the hub.

Usually, the drive hubs have a freewheel, which interrupts the torque path through the hub to the hub shell if the hub shell is rotated further, but from the driver side no rotational movement occurs.

The relations in the torque path through the hub change if a rotational movement is initiated to the hub shell instead of to the driver. The backwards rotational direction with an opposite rotation to the hub shell then corresponds to the reverse direction of the freewheel in the torque path. The torque path is not interrupted in this case. The directionality of the rotation is opposite to the directionality with a forwards rotation, but the torsional moments present in the torque path correspond to those of a forward rotation. The rotational movement is transferred to the driver and from there over the drive chain to the foot pedal drive. In other words, when the bicycle is moved backwards, causing the wheel and hub shell to rotate backwards, the cranks and pedals also move in reverse. This movement can be harmful and undesirable.

A backwards movement of the foot pedals is harmful when, for instance, a bicycle is parked in a bicycle storage facility. The foot pedal is then in the wrong position under certain circumstances, for instance if the bicycle is placed right next to another bicycle in the storage facility to save space. If a bicycle is fitted with a kickstand near the bottom bracket shell, when the bicycle is parked with the retracted kickstand, the foot pedal can hit against the stand and cause problems.

The moving pedals can also hit the leg of the bicyclist in a harmful way, when he pushes the bicycle in front of himself.

The moving pedals are especially harmful if a folding bicycle which is folded up, is pushed backwards, and the pedals, which were first positioned in free, areas between parts of the bicycle frame, hit these parts of the bicycle frame when the bicycle is moved forward and further movement is prevented. In addition, there is then the danger of damage to the bicycle frame.

SUMMARY OF THE INVENTION

The invention thus has the task of making possible the backwards rotation of a hub shell of a bicycle hub, without the foot pedal rotating backwards along with it. This task is made possible by means of a device to disengage a freewheel, which is activated in the case of a backwards rotational movement of the hub shell. For this purpose a friction device is provided, which works together with a control mechanism to disengage the pawls of the freewheel.

These and other features and advantages of the present invention will be more fully understood from the following description of one or more embodiments of the invention, taken together with the accompanying drawings.

DETAILED DESCRIPTION OF THE PREFERRED EMBODIMENTS

Preferred embodiments of the invention will herein be described with reference to the drawings. It will be understood that the drawings and descriptions set out herein are provided for illustration only and do not limit the invention as defined by, the claims appended hereto and any and all their equivalents.

Figure 1:
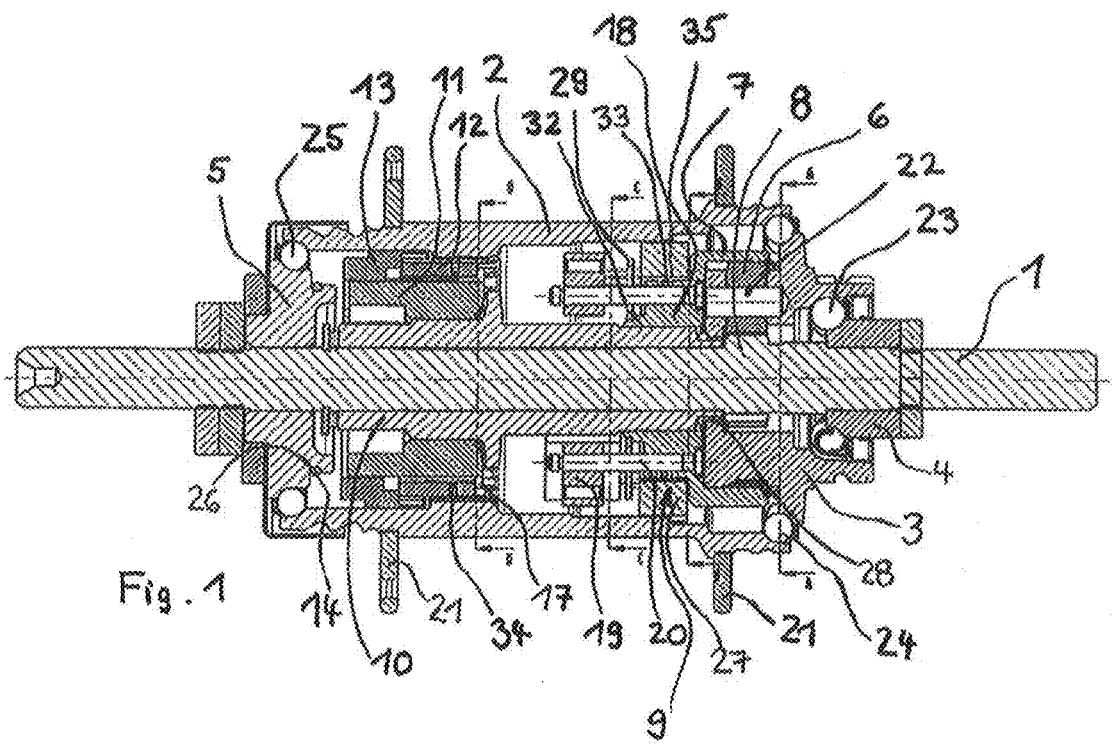
FIG. 1 shows a two-speed gear hub, which is automatically switched depending on speed, in cross section along the central longitudinal axis.

The bicycle hub with the ratchet freewheel of the invention according to FIG. 1 has a hub axle 1, which is firmly connectable to a bicycle frame, which is not shown. Positioned rotationally in relation to hub axle 1 are a driver 3 as well as the hub body or hub shell 2 by means of ball bearings I through III—23, 24, 25. The hub shell 2 has two spoke flanges 21 to receive the ends of spokes which are not shown.

Figure 2:
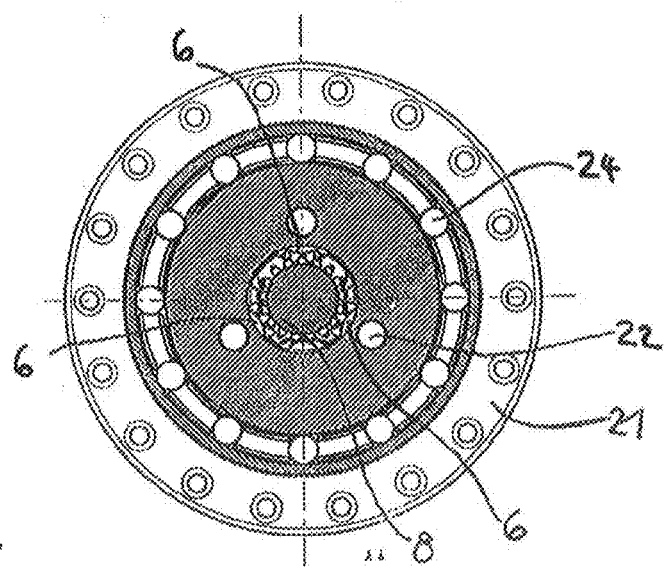
FIG. 2 shows the hub of FIG. 1, cut by the drive at position A-A, where there is also a ball bearing.

The planetary gear mechanism with the sun gear 8 visible in FIG. 2, with the planet gears 6 engaged with this sun gear 8 as well as a ring gear 7, makes two speeds available. The sun gear 8 is connected integrally and therefore in a torque-proof manner, with the hub axle 1. The planet gears 6 are engaged with a ring gear 7 and the sun gear 8. The driver 3 is connected in a one-piece way with the planet gear carrier of the planet gear, in which the planet gear 6 is positioned in such a way that it can rotate around each planet gear axle 22.

The planet gear connected with a shift mechanism makes it possible to switch automatically, depending on the rotational speed of the ring gear 7, between two speeds or transmission ratios.

Figure 3:
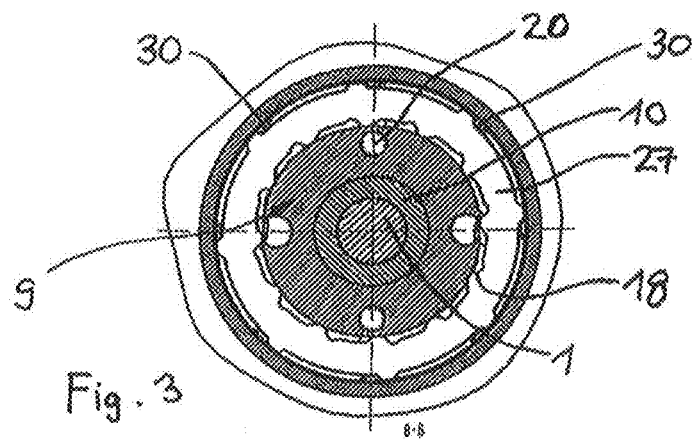
FIG. 3 shows a section of the hub of FIG. 1 at position B-B, between the driver and a toothed sleeve.
Figure 4:
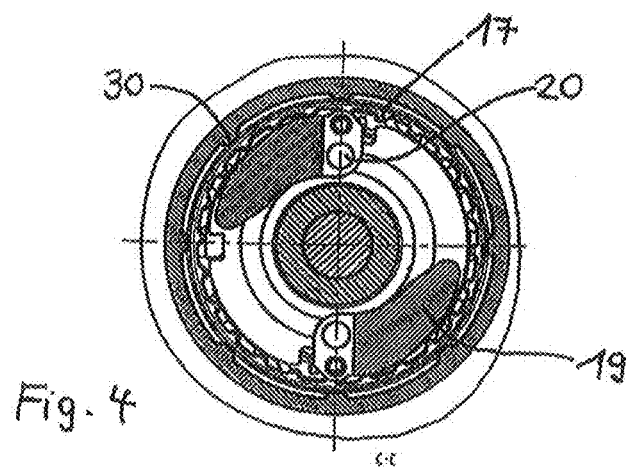
FIG. 4 shows a section through the gear hub of FIG. 1 at position C-C of fly weights of a shift mechanism.
Figure 5:
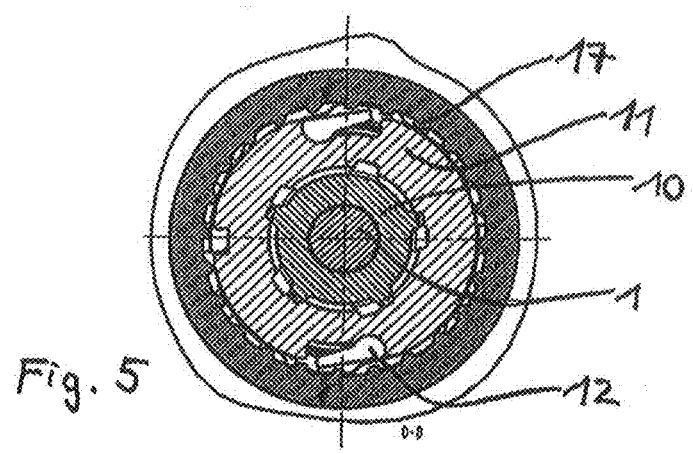
FIG. 5 shows a section through the hub of FIG. 1 at position D-D, where the pawls of a direct gear freewheel are located.

In FIG. 3 a toothed sleeve 27 is shown, which includes overdrive gear teeth 18 towards the radial inside as well as a driving profile towards the radial outside for rotational coupling with the hub shell gear 30 at the hub shell 2. At an axial extension 35 of the ring gear 7, the overdrive gear pawls 9, which are not shown, are positioned on the radial level of the spring 33 for the overdrive gear pawl 9 visible in FIG. 1, which can engage with the overdrive gear teeth 18 on the toothed sleeve 27. Their engagement can be prevented by a pawl control cam 29, which is centered and positioned on an extension 32 of the ring gear. Thereby the pawl control cam 29 is rotated by means of the working of the fly weights 19, which are shown in FIG. 4, in relation to the overdrive gear pawls 9, whereby control contours work together at the pawl control cam 29 with the overdrive gear pawls 9. Each time, a fly weight 19 is rotationally positioned at a fly weight bolt 20, which extends in a direction parallel to the hub axle 1 and is firmly connected with the axial extension 35 of the ring gear 7. In the case of correspondingly larger rotational speed of the ring gear, the fly weights pivot towards the radial outside and release the overdrive gear pawls 9 for engagement with the overdrive gear teeth 18 inside the toothed sleeve 27, whereby after a backlash of the toothed sleeve 27 in relation to the hub shell 2, the toothed sleeve 27 rotates with the hub shell 2. The released overdrive gear pawls 9 are, as usual, pivoted by a spring in the direction of the overdrive gear teeth 18. A pivoting of the fly weights 19 in the opposite direction towards the radial inside is carried out by means of a reset spring, which is not shown.

In a radial direction between the planetary gear mechanism and the hub axle 2, a casing 10 is positioned, which is connected in a torque-proof manner by means of a synchronization gearing 28 with the driver 3. This casing 10 extends in an axial direction to a larger hub cone 5. This hub cone 5 is between the hub axle 1 and the hub shell 2, and is torque-proof in relation to the hub axle 1.

If the overdrive gear pawls 9 are not in contact, the direct gear is engaged in the drive hub. Then, together with the driver 3, the planet gears 6, the ring gear 7, the fly weights 19, the casing 10, the direct gear pawls 12, and the hub shell 2 rotate in a forward rotational direction. Whether the drive of the hub shell 2 comes from the direct gear pawl 12 or from the overdrive gear pawls 9, depends on the switching state of the fly weights 19, and consequently, on the position of the pawl control cam 29.

Figure 6:
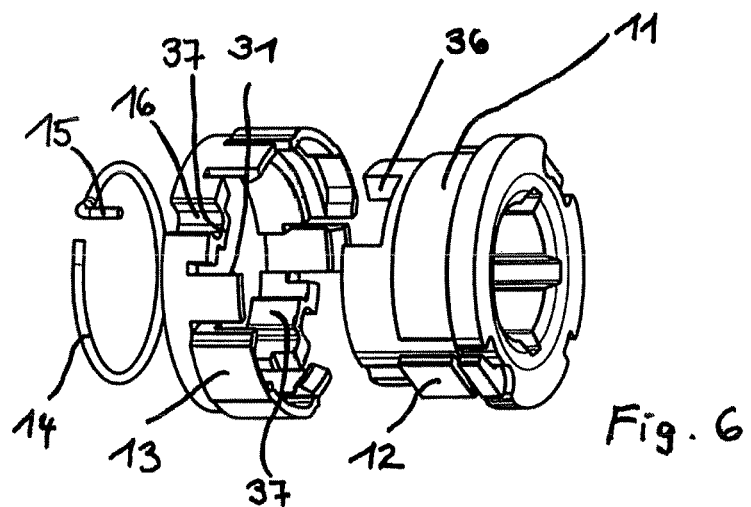
FIG. 6 shows the friction device for controlling the direct gear freewheel of FIG. 5 in perspective view obliquely from the side of the planet gear.
Figure 7:
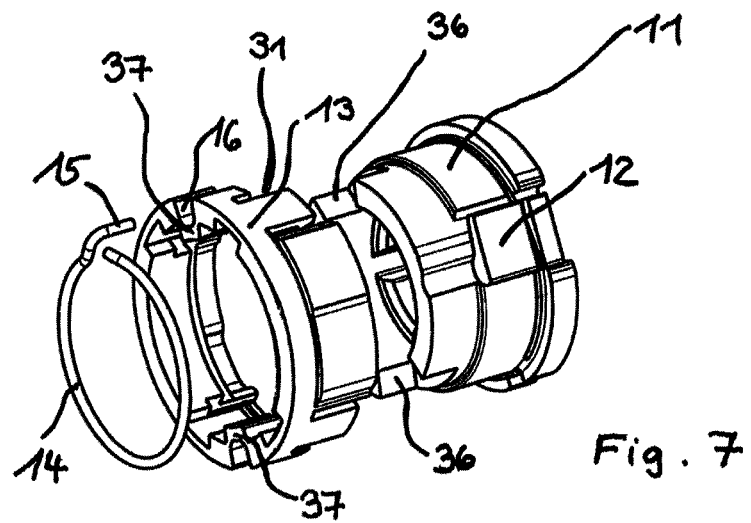
FIG. 7 shows the friction device for controlling the direct gear freewheel of FIG. 5 in perspective view obliquely from the side which is turned away from the planet gear.

The control mechanism is positioned in the area radially between the casing 10 and the hub shell 2, as well as axially between the larger hub cone 5 and the fly weights 19, and it makes possible the backwards rotation of the hub shell 2 in relation to the hub axle, without the driver 3 having to rotate along with it. This control mechanism is represented in an exploded view in FIGS. 6 and 7, whereby in FIG. 6 the perspective is from the side of the driver and in FIG. 7 it is from the side of the larger hub cone 5. The components of the control mechanism include a friction spring or friction device 14, a pawl carrier 11, and a control part or sleeve 13 connected to pawl carrier 11.

The pawl carrier 11 has the direct gear pawls 12, which are biased by a spring 34 for engagement with the direct gear teeth 17. The direct gear pawls 12 can engage with the direct gear teeth 17 on the inner periphery of the hub shell 2, in the case of a relative forward rotation in relation to the hub shell 2. If the hub shell 2 is rotated backwards in relation to the direct gear pawls 12, the direct gear pawls 12 first come into contact with the direct gear teeth 17 at the hub shell 2, and the direct gear pawls 12, and with them the pawl carriers 11, are taken along with them in rotation. In the case of backwards rotation of the pawl carrier, a relative rotation of the pawl carrier 11 in relation to the control sleeve or part 13 occurs, because this is prevented from rotating backwards by the friction spring 14. In addition, a spring projection 15 is formed on one end of the friction spring 14 and disposed in a spring projection receptacle 16 in the control sleeve 13, while the other segment of the friction spring is formed as a ring which engages with a friction spring receptacle 26 at the larger hub cone 5 and generates a drag or frictional force. The friction spring 14 is formed in such a way that in the case of backwards rotation of the spring projection 15 in relation to the friction spring receptacle 26, the ring is tendentially constricted and the frictional force is increased in relation to the frictional force which already exists because of pre-loading between friction spring 14 and friction spring receptacle 26.

The pawl carrier 11 can rotate relative to the control sleeve 13, until a stop projection 37 protruding radially to the inside of the control sleeve 13 connects with the rotation stop 36 on the axial end of the pawl carrier 11. At this relative rotation of the pawl carrier 11 in relation to the control sleeve 13, the direct gear pawls 12 are pushed against a control edge 31 on the control sleeve and thereby pushed radially to the inside and so taken out of operation. Thereby, they are disengaged from the direct gear teeth 17 on the hub shell 2, and the hub shell can also rotate backwards without being stopped. The elements in the torque path on the inside of the hub stand still, and with them the foot pedal of the chain drive. Thereby the goal of the invention is achieved to suppress backwards rotation of the foot pedal in the case of backwards rotation of the hub shell. The described disengagement of the direct gear pawls 12 occurs in a state in which there are no forces operating between the direct gear pawl 12 and the direct gear teeth 17, except frictional forces in the torque path. Thereby the direct gear pawl 12 does not resist the disengagement, and the frictional force of the friction spring 14 is sufficient for the reversal process.

It is not necessary to also disengage the overdrive gear pawls 9 in the case of backwards rotation of the hub shell 2. In the operating conditions in which the principle of the invention would be applied there is such a low rotational speed, that the fly weights have not yet released the overdrive gear pawls 9 for engagement with the overdrive gear teeth 18.

An object of the invention includes preventing the backwards rotation of the foot pedal in the case of backwards rotation of the hub shell, as it is sometimes harmful, for example when a folded up folding bicycle is pushed backwards, there can be damage to the back wheel. This is not dependent on the form of execution described, and also not dependent on a bicycle hub with a gear box. The basic principle is also applicable to a hub without a gear box.

The direction of friction could be constructed as a multiple disk clutch, and it could also create a functional coupling with another component which rotates in any torque path relative to the freewheel. It is only important that these movement relations should exist in all of the gear speeds which can be used.

Instead of a freewheel with pawls and ratchet teeth, a freewheel with rollers i.e. a roller clutch could be used and the freewheel of the invention should not be positioned in the direct gear torque path.

The example of execution shown of a drive hub according to the invention does not have a hub brake. Other examples of execution could likewise be provided with a hub brake.

The principle is also not limited to use in a conventional bicycle. It can also be used on a bicycle with foot pedals directly on the drive hub.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A bicycle drive hub for crank operated vehicles wherein the drive hub comprises:
   a hub axle;
   a hub shell rotatably mounted about the hub axle;
   a driver mounted about the hub axle;

a freewheel in a torque path in the drive hub between the driver and the hub shell, wherein backwards rotational movement of the hub shell relative to the crank operated vehicle causes the freewheel to become disengaged, so that no torque is transferred to the torque path; and a control mechanism including a control sleeve engaged with a friction spring, whereby in all the operating states of the drive hub, a forwards rotation of the driver causes the control sleeve to permit engagement of the freewheel in the torque path.

2. The drive hub of claim 1, wherein the friction spring is positioned between the control sleeve and a larger hub cone, wherein the larger hub cone is fixed to the hub axle.

3. The drive hub of claim 1, wherein the freewheel includes a direct gear pawl which pivots radially against the force of a spring, and wherein the direct gear pawl is positioned to engage direct gear teeth.

4. The drive hub of claim 3, wherein the control sleeve prevents the direct gear pawl of the freewheel from engaging the direct gear teeth when the hub shell rotates backwards.

5. The drive hub of claim 4, whereby the direct gear pawl of the freewheel is carried on a pawl carrier and is prevented from engaging the direct gear teeth when the pawl carrier rotates relative to the control sleeve such that the direct gear pawls are pushed radially to the inside by the control sleeve and are thereby taken out of operation to permit the hub shell to freely rotate backwards with the hub shell disengaged from the direct gear pawls when the hub shell rotates backwards.

6. The drive hub of claim 3, wherein the control sleeve has circumferential backlash with a pawl carrier of the direct gear pawl, and when the circumferential backlash is overcome the direct gear pawl is brought out of engagement with the direct gear teeth.

7. The drive hub of claim 1, wherein the friction spring includes a ring-shaped bent segment and a segment which is bent to the side to form a spring projection, whereby the spring projection resides in a spring projection receptacle formed in the control sleeve, in order to rotate together with the control sleeve;

whereby the ring-shaped bent segment engages with a friction spring receptacle on a larger hub cone positioned opposite to the driver and fixed to the hub axle, in order to connect with the larger hub cone.

8. The drive hub of claim 1 wherein the drive hub is a gear hub including a planetary gear mechanism including two torque paths with different transmission ratios, which is switched depending on the rotation speed of the driver between a torque path with a direct gear and a torque path with an overdrive gear.

9. The drive hub of claim 8 wherein the planetary gear mechanism includes the driver and a planet gear carrier formed as one part.

10. The drive hub of claim 8 wherein the planetary gear mechanism includes a ring gear positioned in the torque path with the overdrive gear, the ring gear having an axial extension and the axial extension includes a ring gear axial extension, on which a pawl control cam for the automatic switching of an overdrive gear pawl is positioned.

11. The drive hub of claim 8 wherein the freewheel includes a direct gear pawl and direct gear teeth, the freewheel positioned in the torque path between the planetary gear mechanism and the hub shell.

* * * * *